Sept. 4, 1951 C. MILLER Re. 23,407

PLUG AND RECEPTACLE CONSTRUCTION

Original Filed June 22, 1948 2 Sheets-Sheet 1

INVENTOR
CHRISTIAN MILLER
BY William T. Kniesner
ATTORNEY

PLUG AND RECEPTACLE CONSTRUCTION

Original Filed June 22, 1948 2 Sheets-Sheet 2

INVENTOR
CHRISTIAN MILLER
BY William T Kuraner
ATTORNEY

Reissued Sept. 4, 1951 Re. 23,407

UNITED STATES PATENT OFFICE 23,407

PLUG AND RECEPTACLE CONSTRUCTION

Christian Miller, Norwalk, Conn., assignor to Edwards and Company, Inc., Norwalk, Conn., a corporation of New York Original No. 2,503,286, dated April 11, 1950, Serial No. 34,535, June 22, 1948. Application for reissue December 22, 1950, Serial No. 202,283

11 Claims. (Cl. 200—51.1)

Matter enclosed in heavy brackets [ ] appears in the original patent but forms no part of this reissue specification; matter printed in italics indicates the additions made by reissue.

This application is a continuation-in-part of application Serial No. 742,694, now abandoned, filed April 19, 1947.

This invention relates to a disconnectable plug and receptacle construction for use in a hospital signalling system wherein the patient can actuate one or more signals and the circuits operating those signals can be restored by the attendant only at the place the signal as initiated.

It is an object of the present invention to provide such a plug and receptacle so designed that if the plug becomes detached from the receptacle, the signal circuits are closed and the signals are actuated and remain so until re-set by an attendant.

It is a further object of the invention to provide such a device in which, when it has been set so that the signals will not be actuated after removal of the plug, means are provided in the plug to put the device in operating condition upon insertion of the plug into the receptacle.

Further and additional objects will be in part obvious or in part pointed out hereinafter.

The invention consists in the features of construction, combination of elements, and arrangement of parts as will be exemplified in the construction hereinafter described and the scope of the application of which will be indicated in the following claims.

In the accompanying drawings which form a part of this specification:

Similar reference characters refer to similar parts throughout the several views of the drawings.

Figure 1:
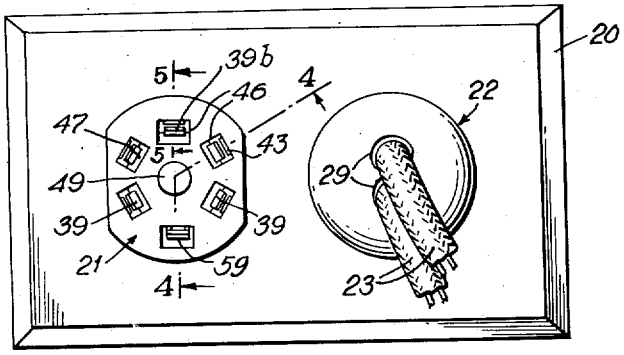
Fig. 1 is a plan view of the receptacle shown in a wall mounting plate.

Referring to Fig. 1, a wall mounting plate 20 is provided with appropriate openings so that the upper portion 21 of one or more receptacles may be secured therein flush with outer face of mounting plate 20. Each one of portions 21 accommodates a plug 22 to which electrical conductors 23 extending to the patient's switching device (not shown) are attached.

Figure 2:
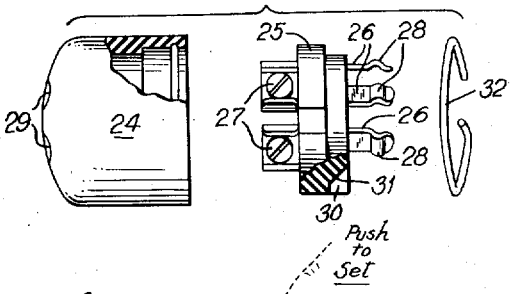
Fig. 2 is an exploded view partly in cross-section showing the plug and its contact fingers.

Referring more particularly to Fig. 2, the plug consists of a casing 24, mounting block 25 made of insulating material to which the desired number of contact fingers 26 are suitably fixed in any desirable manner and connected to their respective circuits as shown at 27, and retaining ring 32 to hold mounting block 25 in its proper position in casing 24 when the plug is completely assembled. Contact fingers 26 made of electrically conductive material are provided with spring V-bends 28. The ends of electrical conductors 23 are connected to the ends of contact fingers 26 at 27 and pass through holes 29 in casing 24. Mounting block 25 is provided with an indentation 30 having an inclined face 31, the purpose of which will be hereinafter described.

Figure 3:
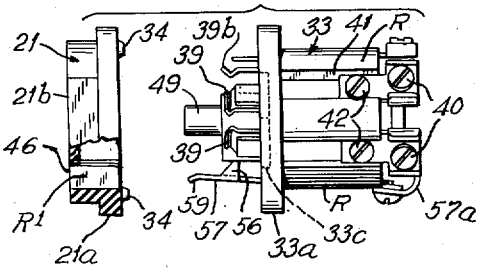
Fig. 3 is an exploded view partly in cross-section of the receptacle.
Figure 4:
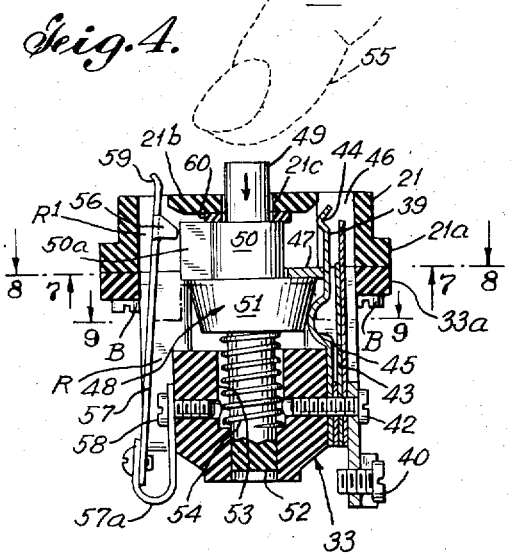
Fig. 4 is a cross-section of the receptacle on the line 4—4 of Fig. 1, *showing the parts in readiness for manual actuation after removal of the plug connector;*
Figure 7:
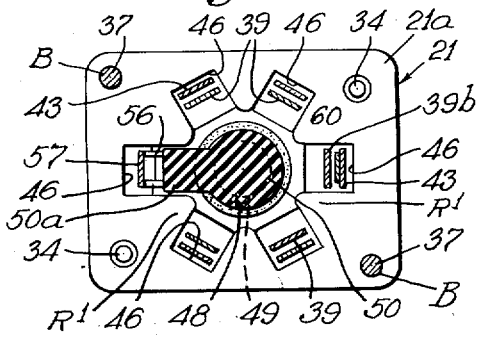
Fig. 7 is a cross-section on the line 7—7 of Fig. 4 looking in the direction of the arrows adjacent those reference characters.

Referring to Figs. 3 and 4, the receptacle comprises two portions, upper portion 21 and lower portion 33 (as viewed in Fig. 4), both being made of insulating material. *Lower portion 33 (Figs. 4 and 12) has a bottom part 33b in the external sides of which extend vertical grooves 41 (Fig. 3), forming ribs R therebetween which extend in spaced relation (Fig. 9) to terminate at their upper ends (Fig. 4) in a centrally apertured transverse flange part 33a (Fig. 8), thereby extending the grooves 41 through the latter. Upper portion 21 has a transverse flange-like part 21a to mate with the flange part 33a and is centrally apertured (Fig. 7) and shaped to have vertically extending rib-like parts $R^1$ which in assembly of the parts respectively overlie the rib-like parts R of the lower portion 33, forming therebetween*

Figure 8:
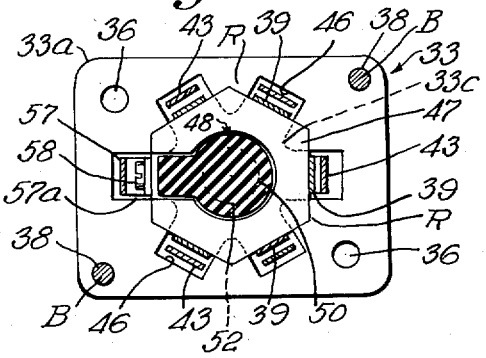
Fig. 8 is a cross-section on the line 8—8 of Fig. 4 looking in the direction of the arrows adjacent those characters.
Figure 9:
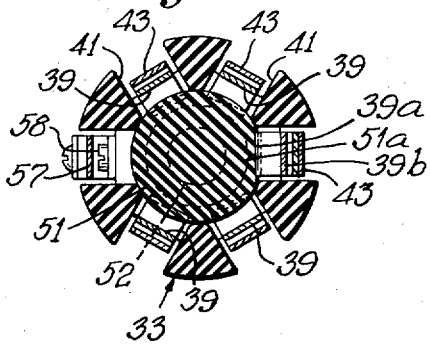
Fig. 9 is a cross-section on the line 9—9 of Fig. 4.

*(see Fig. 7) continuations of the slots or grooves 41; upper portion 21 has a top wall 21b provided with a central hole 21c, and grouped about the latter (as shown in Fig. 1) are holes 46, one for each of the spaces between the rib-like parts just described.* Upper portion 21 is provided with lugs 34 which fit into recesses 36 in lower portion 33 (see Fig. 8). In order to insure that portions 21 and 33 are properly assembled, lugs 34 and recesses 36 are of different size. Means are also provided, such as threaded holes 37 and 38 *(see Figs. 7 and 8) in the flanges 21a and 33a* through which bolts *B* may be passed, to secure portions 21 and 33 firmly together after assembly.

There may be as many signalling circuits as desired. In the form illustrated, five contact fingers [26] *39 in the receptacle 21—33* are provided for four signalling circuits *and five companion contact fingers or prongs 26 in the plug connector 22,* one contact finger *of each* functioning, as hereinafter described, to close *or complete* the return or ground circuit. The circuits through the device are made from the patient's switch (not shown) at the end of conductors 23 through contact fingers 26 in plug 22 to *the companion or engaged* contact fingers [39] in *the* receptacle [33] *21—33,* then to a permanent circuit in the wall through connectors 40 *of which there is one for each of the spring contact fingers of the receptacle 21—33.* When the patient operates one or more switching devices, the return circuit and one or more of the signalling circuits are closed in this manner. When the patient does not actuate the switching device, these circuits are open at that device.

Contact fingers 39 (Figs. 3 and 4) are mounted in lower portion 33 in grooves 41 designed for that purpose *and they extend upwardly between the rib-like parts R of the lower portion 33 and into the upper portion 21 between the rib-like parts $R^1$ of the latter, each terminating just below a hole 46 in the top wall 21b (Fig. 4).* Contact fingers 39, which are made of a resilient electrically conductive material, are firmly held in place by screws 42 *(Figs. 3, 4, 5, and 12)* or in any other appropriate manner. However, for positive operation of the device, there is mounted radially outside of contact fingers 39 one or more backing springs 43. Contact fingers 39 have spring V-bends 44 which, when the device is assembled, cooperate with spring V-bends 28 in contact fingers 26 to move contact fingers 39 radially outward and to insure good electrical contact between the corresponding contact fingers 26 and 39. Contact fingers 39 are also provided with substantially U-shaped cam bends 45, the purpose of which will be hereinafter described.

Figure 11:
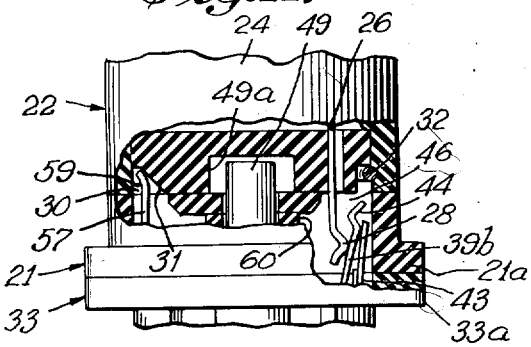
Fig. 11 is a fragmentary cross-section of the plug and receptacle in assembled position; *and*

[It is obvious that when] When plug 22 is inserted in receptacle [21 and 33] *21—33,* contact fingers 26 pass through the holes 46 provided for that purpose in portion 21 and engage contact fingers 39 as shown in Fig. 11. However, when plug 22 is detached from the receptacle [it is obvious that], the circuits are no longer [completed] *extended* through contact fingers 26 and 39 because these sets of fingers are separated.

Figure 5:
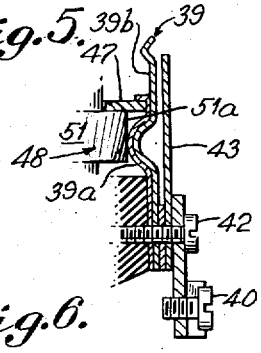
Fig. 5 is a fragmentary cross-sectional view *as seen along the line 5—5 of Fig. 1,* showing the special design of the receptacle contact finger connected to the ground or return circuit.

This invention provides a means whereby signals can be transmitted when the above condition pertains. In general, this means comprises a conductive or [short circuiting] *circuit-closing* plate 47 positioned in a properly formed recess in the upper part of portion 33. *This recess is indicated at 33c in Figs. 3 and 8, being formed in the upper ends of the rib-like parts R of the lower portion 33, the plate 47 thereby resting with its upper face substantially flush with the upper face of the flange part 33a (Figs. 4 and 12); when the upper portion 21 is assembled to the lower portion 33, the rib-like parts $R^1$ of the former (Figs. 7 and 8) overlie those portions of the plate 47 received in the recess 33c.* Connection through plate 47 is made in the following manner: When the plug 22 is detached, contact fingers 39, due to their shape and spring-like action, move inwardly and contact plate 47; thus the circuits are completed from the permanent circuits in the wall through connectors 40, contact fingers 39, plate 47, and back through whichever contact finger 39 has been chosen for the ground or return circuit. In the case of the contact finger 39b chosen for the ground or return circuit, a slightly different construction is employed, as shown in Fig. 5. In the case of the return circuit, there is no need to break the contact in the receptacle since all circuits are broken on the other side. Therefore, there is provided two contact fingers 39a and 39b for this purpose. Contact finger 39a is arranged radially inside of contact finger 39b, and, in general, is of the same shape but is shorter than contact finger 39b. *As shown in Fig. 5, contact finger 39a does not extend upwardly to an extent where it could be engaged by a contact finger of the plug 22 and preferably it has its upper end bent over onto the contact plate 47.* Contact finger 39a is in contact with plate 47 at all times. *Accordingly contact finger 39b, when engaged by a contact finger 26 of plug 22, is moved radially outwardly and away from contact plate 47, just as are the other contact fingers 39 (see Figs. 11 and 12), but contact finger 39a remains in contact with plate 47.*

Figure 6:
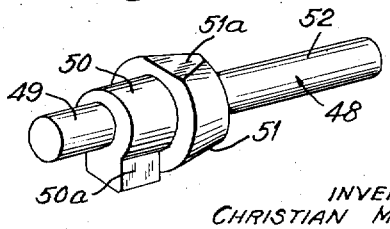
Fig. 6 is a view in perspective of the operating plunger.

[Frequently it is desired to remove plug 22 without actuating all or any of the signal circuits. This is accomplished in the present device by having a] A manually operated plunger 48 *is* centrally disposed in an opening designed for that purpose in lower portion 33. Plunger 48, as shown [most clearly] in Fig. 6, has an upper reduced or stem section 49 which, in its normal position as shown in Fig. 11, extends *through hole 21c and* above the upper portion 21 into a recess 49a provided for that purpose in plug 22. Below stem section 49, plunger 48 has a section 50 of enlarged diameter and having a laterally extending rectangular lug 50a extending over the length of section 50. Below section 50 is a frusto-conical section 51 which has a flat portion 51a, and below that is a stem section 52 of reduced diameter and of substantially the same diameter as stem section 49. [As]

Figure 10:
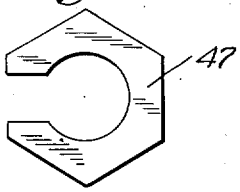
Fig. 10 is a plan view of the conductive or short circuit plate.

As may be seen from Fig. 4, plunger 48 is disposed in receptacle portions 21 and 33 in the following manner when in its normal position: Sections 50 and 50a generally extend from *top wall 21b of* upper portion 21 to and slightly into lower portion 33, *the plate 47 (Figs. 8 and 10) is cut out to accommodate them for up and down movement relative thereto,* the frusto-conical section 51 is located in lower portion 33, *above the bottom part 33b and is surrounded by the rib-like parts R (see Fig. 9) and by the contact fingers 39 between the parts R,* and the upper face of frusto-conical section 51 is close to the lower surface of plate 47. The lower stem portion 52 extends through a central bore in lower section 33 almost to the bottom thereof. The bore through which stem section 52 extends is enlarged, as shown at 53, to provide space for a spring surrounding stem section 52 and exerting pressure against the lower face of frusto-conical section 51. [In the position shown in Fig. 4 the part of frusto-conical section 51 which is of smaller diameter is opposite the U-shaped bends 45 in contact fingers 39, thereby allowing contact fingers 39 to be in contact with plate 47 when plug 22 is withdrawn. If it is desired to prevent the signals being actuated when plug 22 is withdrawn, plunger 48 is depressed by an attendant as shown at 55 in Fig. 4.] A washer 60 is provided in portion 33 to prevent section 50 of plunger 48 from striking the top of portion [33] 21. *In the position shown in Fig. 4, the part of frusto-conical section 51 which is of smaller diameter is opposite the U-shaped bends 45 in contact fingers 39, thereby allowing contact finger 39 to be in contact with plate 47 when plug 22 is withdrawn.*

If it is desired to [prevent] *re-set* the signals [being] actuated when plug 22 is withdrawn, plunger 48 is depressed by an attendant, as shown at 55 in Fig. 4. This puts plunger 48 in the position shown in Fig. 12 and the portion of frusto-conical section 51 of larger diameter bears against the U-shaped bends 45 in contact with fingers 39, moving them outwardly so that contact between contact fingers 39 and plate 47 is broken and the circuits are opened at that point. Neither contact finger 39*a* nor contact finger 39*b* for the return circuit is bent outwardly away from plate 47 by plunger 48, because plunger 48 is placed in the receptacle portion 33 so that flat portion 51*a* of frusto-conical section 51 is adjacent to contact fingers 39*a*, 39*b* and does not result in any camming action.

Figure 12:
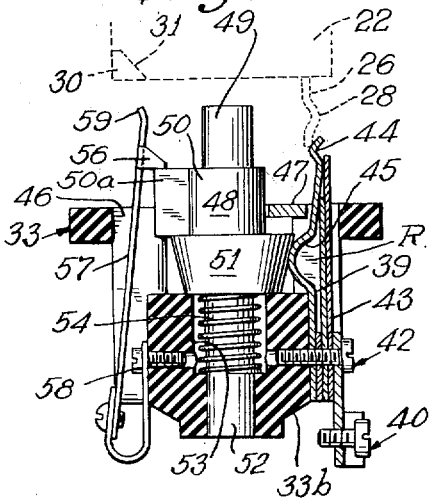
Fig. 12 is a fragmentary cross-section *as seen along the line 4—4 of Fig. 1,* showing the plunger in its pre-set position to prevent actuation of the signals and the relative position of the cooperating plug elements *about to be assembled to the receptacle.*

In order to keep plunger 48 in the position shown in Fig. 12 without having to continue pressure of the attendant's finger, a locking device is provided. This consists of ears 56 mounted on a spring device 57 and 57*a* attached to lower portion 33 in the manner shown at 58 or in any other suitable manner. Spring 57, 57*a* is so designed that it tends to move ears 56 radially inward. In the normal position of plunger 48, these ears rest against the side of rectangular lug section 50*a*. However, when plunger 48 is depressed, as in Fig. 12, ears 56 rest on the top surface of rectangular lug section 50*a*, thereby holding it down against the pressure of spring 54 and any vertical force exerted against frusto-conical section 51. End 59 of spring 57 is shaped to cooperate with recess 30 and inclined wall 31 of that recess in plug 22 so that, as diagrammatically illustrated in Fig. 12, when the plug is *assembled to the receptacle 21—33 and its contact fingers 26* inserted into the receptacle, surface 31 bears against spring end 59 so as to move it radially outward *into the position shown in Fig. 11* and release plunger 48. In this way plunger 48 returns to its normal position when plug 22 is inserted, but contact between contact fingers 39 and plate 47 is prevented because contact fingers 26 have moved into position and forced contact fingers 39 radially outward and out of contact with plate 47. It is to be noted, as shown in Fig. 11, that contact fingers 26 are made of length sufficiently to assure contact with contact fingers 39, but do not extend so that any of them can [.] *touch plate 47* at any time [touch plate 47].

I claim:

1. In a hospital signalling system, a plug and receptacle combination in which the plug has a plurality of electrical contacts and the receptacle has a plurality of corresponding spring-like electrical contacts, means comprising an electrically conductive plate adapted for contacting said contacts in said receptacle and thereby [short circuiting] *interconnecting* the circuits connected to said contacts when said plug is removed from said receptacle, and means for manually preventing *only certain of* said contacts from contacting said plate, said last-mentioned means including a manually operated plunger having a frusto-conical section [co-operating with said contacts in said receptacle] *for coaction with certain of said receptacle contacts and a straight section juxtaposed to the other of said receptacle contacts whereby only the former are moved out of engagement with said contact plate in response to manual actuation of said plunger.*

2. In a hospital signalling system, a plug and receptacle combination in which the plug has a plurality of electrical contacts and the receptacle has a plurality of corresponding spring-like electrical contacts, means comprising an electrically conductive plate adapted for contacting said contacts in said receptacle and thereby [short circuiting] *interconnecting* the circuits connected to said contacts when said plug is removed from said receptacle, and means for manually [preventing said contacts from] *moving only certain of said receptacle contacts away from* said plate, said last-mentioned means including a manually operated plunger having a frusto-conical section [co-operating with said contacts in said receptacle,] *for coaction with said certain receptacle contacts and a straight section juxtaposed to the other of the receptacle contacts whereby only the former are moved out of engagement with said contact plate in response to manual actuation of said plunger, said plunger having means forming a lug thereon substantially on the other side of the axis of said plunger from said straight section,* and means [for locking said plunger in a position where it prevents said contacts from contacting said plate] *cooperating with said lug for locking said plunger in actuated position and thereby holding the contacts moved by it out of engagement with said conductive plate.*

3. In a hospital signalling system, a plug and receptacle combination in which the plug has a plurality of electrical contacts and the receptacle has a plurality of corresponding spring-like electrical contacts, means comprising an electrically conductive plate adapted for contacting said contacts in said receptacle and thereby [short circuiting] *interconnecting* the circuits connected to said contacts when said plug is removed from said receptacle [and], means for manually [preventing] *moving only certain of* said *receptacle* contacts *away* from [contacting] said plate, said last-mentioned means including a manually operated plunger having a frusto-conical section [co-operating] *for coaction* with said *certain receptacle* contacts [in said receptacle] *and a straight section juxtaposed to the other of the receptacle contacts whereby only the former are moved out of engagement with said contact plate in response to manual actuation of said plunger, said plunger having means forming a lug thereon substantially on the other side of the axis of said plunger from said straight section,* [spring operated] means *cooperating with said lug* for locking said plunger in *actuated* position *and thereby holding the contacts moved by it out of engagement with said conductive plate* [to prevent said contacts from contacting said plate], and means contained in said plug for releasing said locking means [when said plug is inserted in], *said locking means of said receptacle having a control member positioned on the other side of the axis of said plunger from said straight section and actuated by said plug means in response to movement of assembly of said plug to* said receptacle.

4. In a hospital signalling system, a plug and receptacle combination in which the plug has a plurality of electrical contacts and the receptacle has a plurality of corresponding spring-like electrical contacts, means comprising an electrically conductive plate adapted for contacting said contacts in said receptacle and thereby [short circuiting] *interconnecting* the circuits connected to said contacts when said plug is removed from said receptacle, and means for manually preventing said contacts from contacting said plate, said last-mentioned means including a manually operated plunger having a frusto-conical section cooperating with said contacts in said receptacle, spring operated means for locking said plunger in position to prevent said contacts from contacting said plate and means contained in said plug for releasing said locking means when said plug is inserted in said receptacle, said releasing means comprising a cam-acting surface in said plug cooperating with an extension of said spring operated means.

5. A signalling plug and receptacle construction comprising a plug body having a plurality of plug contacts projecting from its bottom end, a receptacle body having an end face provided with a plurality of recesses for entry thereinto of plug contacts and having contact elements therein engageable by the plug contacts for thereby extending signalling circuits, said receptacle body having a movable spring-biased generally cylindrical member having a frusto-conical section and *a* stem section of reduced diameter of insulating material *that is* projectable out of said end face *through an aperture therein* and said plug body having a hollow space in its bottom end into which a portion *of said stem section* of said movable member may enter, *said receptacle body having an aperture laterally spaced from the aperture through which said projectable stem section is projectable,* means including said *contact elements* [plug contacts] responsive to disengagement of said plug from said receptacle for effecting closure of at least certain of said signalling circuits and means including said frusto-conical section responsive to inward movement of said movable member from its projected position for effecting opening of the signalling circuits that are closed in response to disengagement of the plug contacts from the receptacle, a movable control member carried by said receptacle body and accessible through *said last-mentioned aperture* and having means operating to hold said spring-biased member in inward position against the bias of its spring and operable in response to movement of said control member to release said spring-biased member for outward projection, and means exposed at the bottom end of said plug body *and substantially juxtaposed to said second-mentioned aperture* [and movable relative to said plug body] for engagement with said movable control member to effect movement [thereon] *thereof* in a direction to release said movable spring-biased member.

6. A signalling plug and receptacle construction as claimed in claim 5 in which said last-mentioned means comprises a cam element at the bottom end of the plug body, said cam element having a cam face that is inclined to the direction of movement of assembly of the plug body to the receptacle body to thereby effect movement of said movable control element upon assembly of the plug body and its plug contacts to the receptacle body and its contact elements respectively.

[7. A signalling plug and receptacle construction as claimed in claim 5 in which said last mentioned means comprises an operating element having means mounting it for movement relative to the plug body and along a path to engage said moveable control member and effecting movement thereof, and means operable from the exterior of said plug body for effecting movement of said moveable element.]

[8. A signalling plug and receptacle construction as claimed in claim 5 in which said last mentioned means comprises an operating element having means mounting it for movement relative to the plug body and along a path to engage said moveable control member and effecting movement thereof, said receptacle body having extending therefrom a spring-retracted tension element, and means responsive to a stroke of movement of said tension element for operating said moveable element to actuate said spring-biased control member.]

9. A signalling plug and receptacle construction as claimed in claim 5 in which said spring-biased projectable member of the receptacle body and the hollow space in the bottom end of the plug body are positioned substantially at the central axis of the assembled plug body and receptacle body, said movable control member having means mounting it for movement in a general direction toward and away from said axis, said means at the bottom end of the plug body for effecting movement of said control member comprising cam means engageable with said control member upon movement of assembly of the plug body to the receptacle body and having a cam face to resolve the force of said movement of assembly into a radial component to effect movement of said control member.

10. A signalling plug and receptacle construction comprising a plug body having plug contacts and a receptacle body having a plurality of recesses for the reception of plug contacts into the receptacle recesses, a plurality of spring contacts carried by said receptacle body and respectively exposed in such recesses for engagement by such plug contacts as are entered thereinto, said spring contacts being biased inwardly and said receptacle body having therein conductive means with which said inwardly biased contact springs engage, whereby, upon disassembly of said plug body from said receptacle body, said spring contacts move inwardly and engage said conductive means, spring opposed movable means within said receptacle body but extending beyond said receptacle body into a recess in said plug body and adapted upon depression to force said spring contacts out of engagement with said conductive means and having means operating in response to depression to hold it against retrograde movement, said holding means having an operating member extending beyond said receptacle body into a second recess in said plug body, said second recess having cam means for engaging said operating member, said operating member being accessible for manual operation when said plug is removed from said receptacle.

*11. A signalling plug and receptacle construction comprising a receptacle body having an end face and a plurality of recesses distributed in a group and accessible through said end face for the reception of plug contacts into all of said receptacle recesses excepting at least one of them, a plug body having a group of plug contacts which are less in number than said recesses whereby to provide a space in the plug body that is unoccupied by a plug contact, spring contacts carried by said receptacle body and respectively exposed in all of said recesses excepting at least said one recess for engagement respectively by such plug contacts as are entered thereinto upon assembly of the plug body to the receptacle body whereby upon such assembly said one recess is juxtaposed to said space in said plug body, said spring contacts being biased inwardly and said receptacle body having therein conductive means with which said inwardly biased contact springs engage, whereby, upon disassembly of said plug body from said receptacle body, said spring contacts move inwardly and engage said conductive means, spring-opposed movable means within said receptacle body but extending beyond said end face of said receptacle body into a recess in said plug body and adapted upon depression to effect disengagement of said spring contacts from said conductive means and having means operating in response to depression to hold it against retrograde movement, said holding means extending into that one receptacle recess that is juxtaposed to said space in said plug body and having an operating member extending therefrom and beyond the end face of said receptacle body whereby it is accessible for manual operation when said plug is removed from said receptacle, said plug body having cam means positioned in said space and thereby juxtaposed to said one receptacle recess for engaging and actuating said operating member upon assembly of said plug to the receptacle.*

*12. A signalling plug and receptacle construction for a plurality of signalling circuits having a common return line comprising a plug body having plug contacts and a receptacle body having a plurality of recesses for the reception of plug contacts into the receptacle recesses, a plurality of spring contacts carried by said receptacle body and respectively exposed in said recesses for engagement respectively by plug contacts entered thereinto for thereby extending a plurality of signalling circuits, said spring contacts having conductor-connectors respectively aligned therewith for the connection thereto of conductors of said signalling circuits and with the common return line thereof connectable to one of said conductor-connectors whereby the common return line of said circuits is extended by the engagement between one of said plug contacts and said one of said spring contacts and the other sides of said circuits are extended by engagement of other of said plug contacts with other of said spring contacts, conductive means carried by said receptacle body and cooperatively related to said spring contacts, said spring contacts being biased toward said conductive means for engagement therewith whereby, upon disassembly of said plug body from said receptacle body, said spring contacts move into engagement with said conductive means, and manually movable control means carried by said receptacle body for opening circuits closed by engagement of said spring contacts with said conductive means and having means responding to actuation thereof to force only said other receptacle spring contacts out of engagement with said conductive means and to leave said one spring contact substantially unmoved in its recess whereby to identify its conductor-connector as the one to which to connect said common return line and also decrease the force necessary to actuate said movable control means.*

*13. A signalling plug and receptacle construction for a plurality of signalling circuits having a common return line comprising a plug body having plug contacts and a receptacle body having a plurality of recesses for the reception of plug contacts into the receptacle recesses, a plurality of spring contacts carried by said receptacle body and respectively exposed in said recesses for engagement respectively by plug contacts entered thereinto for thereby extending a plurality of signalling circuits, said spring contacts having conductor-connectors respectively aligned therewith for the connection thereto of conductors of said signalling circuits and with the common return line thereof connectable to one of said conductor-connectors whereby the common return line of said circuits is extended by the engagement between one of said plug contacts and said one of said spring contacts and the other sides of said circuits are extended by engagement of other of said plug contacts with other of said spring contacts, and conductive means carried by said receptacle body and cooperatively related to said spring contacts, said spring contacts being biased toward said conductive means for engagement therewith whereby, upon disassembly of said plug body from said receptacle body, said spring contacts move into engagement with said conductive means, said receptacle body having movable control means, said movable control means and only said other receptacle spring contacts having coacting cam-acting parts responsive to actuation of said control means to force only said other spring contacts away from said conductive means and to leave said one spring contact substantially unmoved in its recess whereby to identify its conductor-connector as the one to which to connect said common return line and also decrease the force necessary to actuate said movable control means.*

CHRISTIAN MILLER.

REFERENCES CITED

The following references are of record in the file of this patent or the original patent:

UNITED STATES PATENTS

| Number | Name | Date |
|---|---|---|
| 1,911,513 | Kenerson | May 30, 1933 |
| 2,239,035 | Curtiss | Apr. 22, 1941 |
| 2,405,735 | Crockett | Aug. 13, 1946 |
| 2,475,149 | Miller | July 5, 1949 |